United States Patent
Rodgers et al.

(10) Patent No.: US 8,565,427 B2
(45) Date of Patent: Oct. 22, 2013

(54) ENFORCING SOFTWARE INDEPENDENT CONTENT PROTECTION IN AN ELECTRONIC DEVICE

(75) Inventors: Steve (Stephane) Rodgers, San Diego, CA (US); Sherman (Xuemin) Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 63 days.

(21) Appl. No.: 13/074,083

(22) Filed: Mar. 29, 2011

(65) Prior Publication Data
US 2012/0224688 A1    Sep. 6, 2012

Related U.S. Application Data

(60) Provisional application No. 61/449,370, filed on Mar. 4, 2011.

(51) Int. Cl.
*H04L 29/00* (2006.01)

(52) U.S. Cl.
USPC .............. 380/203; 380/47; 380/227; 370/386

(58) Field of Classification Search
USPC ............................................ 380/47; 370/386
See application file for complete search history.

(56) References Cited

U.S. PATENT DOCUMENTS

| 5,742,680 A * | 4/1998 | Wilson ........................ 380/227 |
| 2001/0030959 A1 * | 10/2001 | Ozawa et al. ................. 370/386 |

* cited by examiner

*Primary Examiner* — Jeffrey Pwu
*Assistant Examiner* — Michael D Anderson
(74) *Attorney, Agent, or Firm* — Garlick & Markison; Bruce E. Garlick

(57) ABSTRACT

A Set Top Box (STB) or client computer includes a communication interface operable to receive digital messages and digital content, memory operable, and processing circuitry coupled to the communication interface and to the memory. The STB is operable to receive a digital message, extract a key portion from the digital message, decrypt the key portion, descramble the digital content using the decrypted key portion, extract a rights portion from the digital message, decrypt the rights portion, determine protected and unprotected digital content based upon the rights portion, write the unprotected digital content to an unprotected portion of the memory, and write the protected digital content to a protected portion of the memory. The decrypted key portion may include a plurality of Program IDs (PIDs) and the decrypted rights portion may include protection data for each PID. A security processor may prevent a central processing unit from accessing the protected portion of the memory.

23 Claims, 14 Drawing Sheets

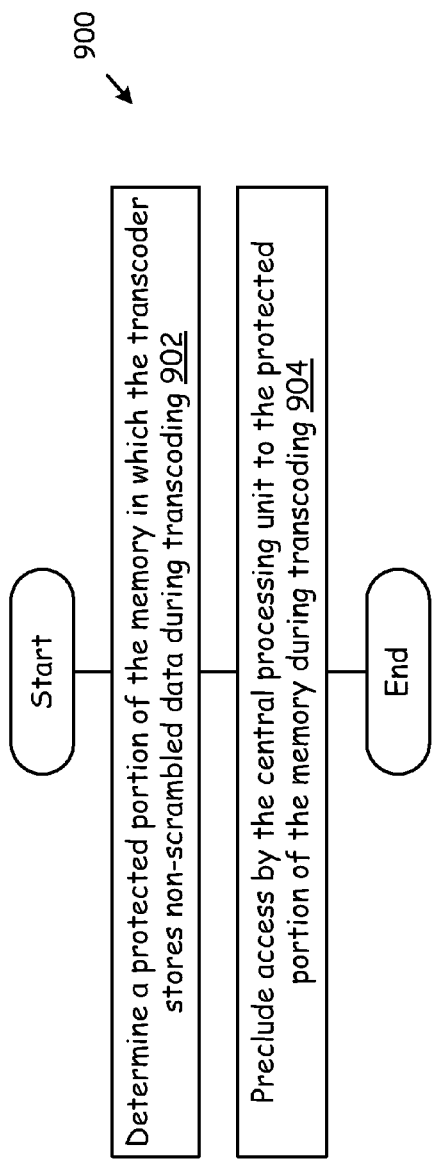
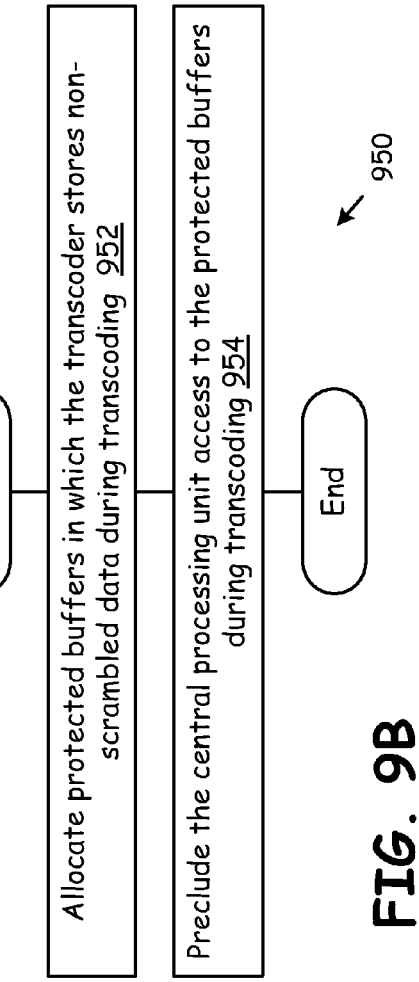
FIG. 9A
FIG. 9B

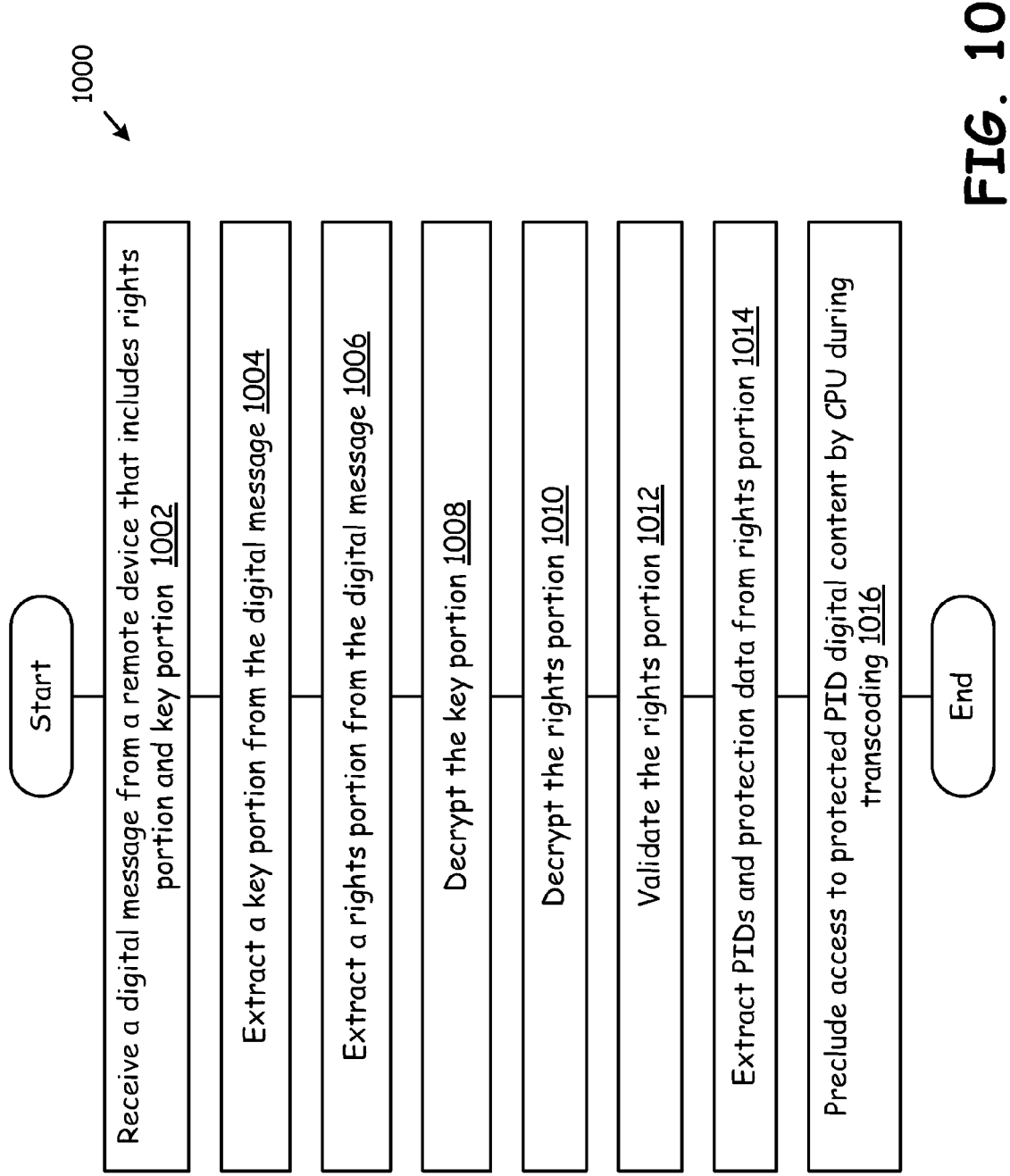

ENFORCING SOFTWARE INDEPENDENT CONTENT PROTECTION IN AN ELECTRONIC DEVICE

CROSS-REFERENCE TO PRIORITY APPLICATION

The present application claims priority to U.S. Provisional Application No. 61/449,370, filed Mar. 4, 2011, which is incorporated herein in its entirety for all purposes.

BACKGROUND

1. Technical Field

The present invention relates generally to communication devices; and more particularly to software security and content security serviced by the communication devices.

2. Related Art

Communication systems are well known. Such communications include wireless networks, wired networks, satellite networks, and various other types of networks. These networks now currently support large volumes of streamed audio and video content. Such content is referred to hereinafter as one or more of video content, audio content, audio/video content, streamed content, digital content, streamed digital content. Such content may be streamed and then stored on an electronic device for later presentation or simply presented upon receipt. All of such digital content has ownership rights established therewith. In order for the owner of the digital content that is transmitted across one or more communication networks to be protected from authorized use, the digital content is typically scrambled/encrypted/encoded or protected using another technique that precludes unauthorized use.

Currently existing networks in which audio and video content is commonly streamed are cable modem networks, satellite service provider networks, wireless wide area networks, digital subscriber line networks, and other types of networks in which content is streamed from a service provider device or a server to a client device or an intermediate device. Service provider networks typically include safeguards to preclude unauthorized users from intercepting and using content. The network operators typically load secure software to client devices, establish secure links between server devices and client devices, and/or encrypted the digital content so that it cannot be easily intercepted and copied. Further, these networks have heretofore been private, limited access, networks. However, the client devices of these networks, e.g., Set Top Boxes (STBs), are increasingly used to run applications that were previously reserved for Personal Computers (PCs). Currently STBs may be connected to open networks such as the Internet. With past systems, the STBs were often closed systems that were protected by safeguards of the provider network including code signature authentication and other validation techniques in systems.

With a central CPU of the STB having access to Internet content, the central CPU is vulnerable to attack by hacking, viruses, and other content that jeopardizes security STB. Typically, when a hacker accesses an STB, the hacker bypasses code updates and otherwise modifies the code that is run by the STB. By having the code made vulnerable, the hacker may access streamed content received and processed by the STB. In this fashion, the hacker may take the content and resell it for profit. Service providers have attempted to get around this problem by assigning code versions to the various code downloads to the STB. However, hackers may overcome this security measure by either blocking code updates or by spoofing the service provider devices into believing that the STB is running valid software.

These and other limitations and deficiencies associated with the related art may be more fully appreciated by those skilled in the art after comparing such related art with various aspects of the present invention as set forth herein with reference to the figures.

BRIEF DESCRIPTION OF THE DRAWINGS

FIG. 9A is a flowchart illustrating operations for protecting digital content from the CPU during the transcoding process;

FIG. 9B is a flowchart illustrating operations of an STB or client device in allocating protected memory for use in the transcoding process of the STB or client device;

FIG. 10 is a flowchart illustrating particular operations for identifying content to be protected from access by a CPU during transcoding according to one or more embodiments of the present invention;

DETAILED DESCRIPTION OF THE DRAWINGS

Figure 1:
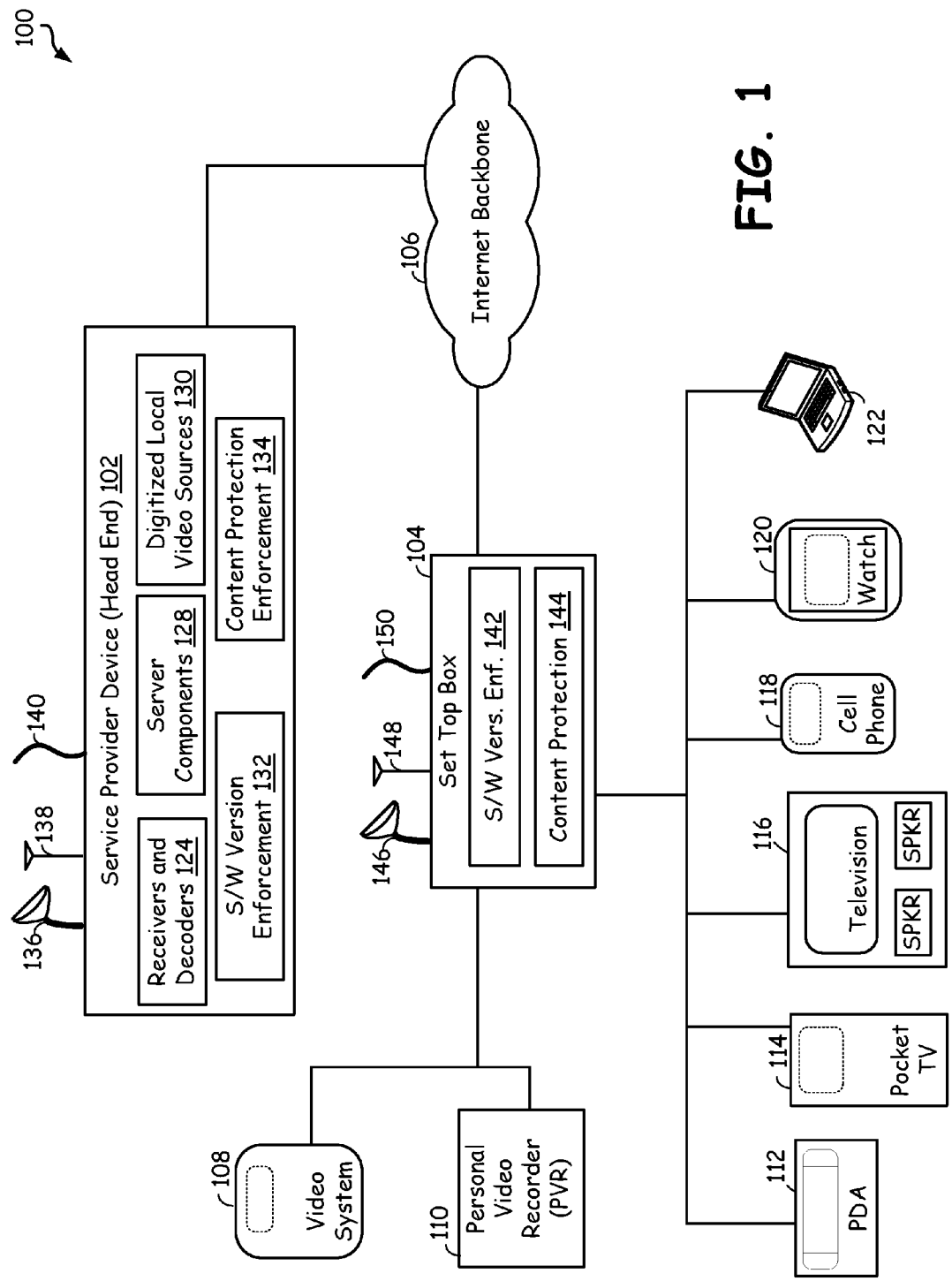
FIG. 1 is a system diagram illustrating a communication system implementing one or more embodiments of the present invention.

FIG. 1 is a system diagram illustrating a communication system implementing one or more embodiments of the present invention. The system 100 of FIG. 1 includes a service provider device 102, which may be a head end, a Set-Top Box (STB) 104, an Internet backbone 106, and a plurality of devices supported by the STB 104. The service provider device 102 may be one or more of a satellite communication system based device, a wireless system supported device, or a media-based network supported communication device. The media-based communication device may be supported by a cable modem network, a telephone network supporting digital subscriber line operations, an optical network, or another type of network having media that couples communications from and to the service provider device 102, or a combination of these. The service provider device 102 may be referred to as a head end, a sever computer, a content server, a server provider computer, and/or interchangeably with other descriptions thereof herein. The service provider device 102 includes one or more receivers and decoders 124, one or more server components 128, one or more digitized local video sources 130, software version enforcement functionality 132, and content protection enforcement functionality 134.

The service provider device 102 couples to the Internet backbone 106. The service provider device 102 may couple to the STB 104 via the Internet backbone 106. Further, the service provider device 102 communicatively couples to the STB 104 via the type of communication network, e.g. satellite network, cable modem network, DSL network, optical network, wireless network of the particular service provider. The head end device 102 includes one or more of a satellite dish 136, an antenna 138, and a media interface 140 for coupling to its service provider network. The service provider device 102 may stream content to STB 104 and/or may provide Internet access to the STB 104. In streaming video and audio content to the STB 104, the service provider device 102 of course desires that the digital content is protected via robust protection techniques. Further, the service provider device 102 controls the software executed by the STB 104 and desires to have that software robustly controlled to avoid hacking and interception of protected audio and video content.

The STB 104 includes software version enforcement functionality 142, content protection enforcement functionality 144, and various other components that will be described further herein with reference to FIG. 2. The STB 104 couples to one or more of a satellite dish 146, an antenna 148, and a media interface 150 to support communication with the service provider device 102. The STB 104 services video system 108, Personal Video Recorder (PVR) 110, Personal Data Assistant (PDA) 112, pocket TV 114, television/media system 116, cell phone 118, watch 120, and digital computer 122. These devices 108, 110, 112, 114, 116, 118, 120, and 122 may be supported wired or wirelessly depending upon the particular embodiment hereof. In such case, the STB 104 provides Internet surfing functionality for each of these various devices 108-122, streamed audio support for these devices, and/or streamed video support for these devices. The devices 108-122 may be supported within a home, a business premises, or some other locale in which the devices 108-122 reside.

The system 100 of FIG. 1 supports various operations according to embodiments of the present invention. According to a first embodiment of the present invention, the service provider device 102 and the STB 104 cooperatively enforce software version robustness of the software upon the STB 104. In such case, using the embodiments of the present invention, the service provider device 102 and STB 104 are able to verify that an appropriate and correct code version of software loaded and implemented by the STB 104 is employed. In such case, by insuring that the appropriate software version STB 104 is employed, minimization of risk of digital content and other downloaded content is supported. Likewise, the STB 104 and head end 102 cooperatively work to protect content that is streamed from the head end 102 to the STB 104. These various operations of the embodiments of the present invention will be described herein with reference to FIGS. 3-5 herein According to another aspect of the present invention, digital content that is downloaded to the STB 104 is only made available to a central CPU of the STB 104 if in indicia that such content should be made available is included with one or more messages received by the STB 104. In such case, the indications may be received in an ECM or another message received by the STB 104 or client device. These principles and operations will be described further with reference to FIGS. 6 and 7 herein.

According to still another aspect of the present invention, a security CPU of the STB 104 operates to preclude access by a central CPU to protected data operated upon by a transcoder of the STB 104 during the transcoding process. These aspects of the present invention will be described with reference to FIGS. 8-11 herein. A central CPU 212 and security CPU 214 of the STB 104 may operate in communication with one another to protect content that is downloaded to the STB from either the service provider device 102 or another device communicatively coupled to the STB 104.

Figure 11:
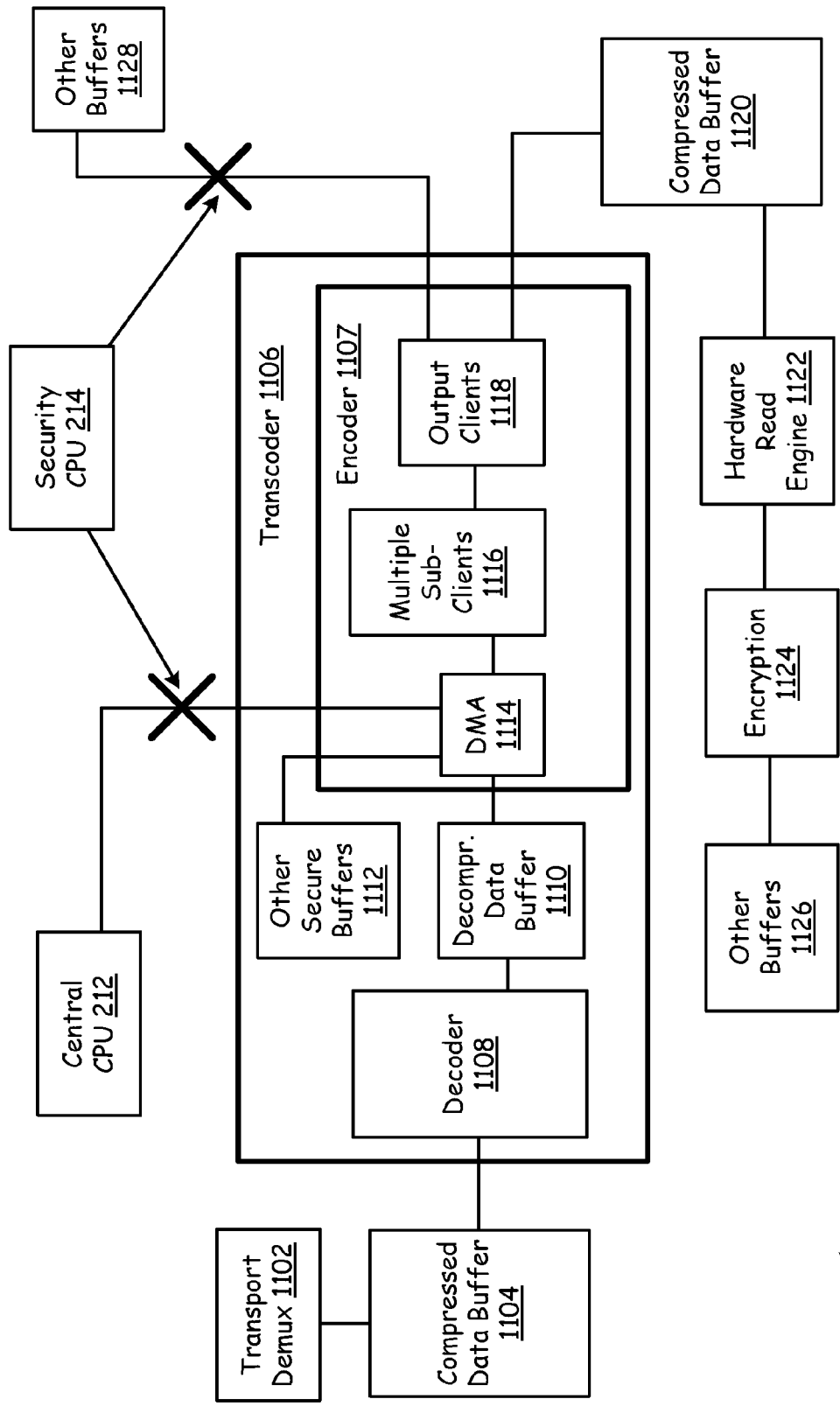
FIG. 11 is a block diagram illustrating the structure of a client device or STB that includes structure for protecting digital content during transcoding.
Figure 12:
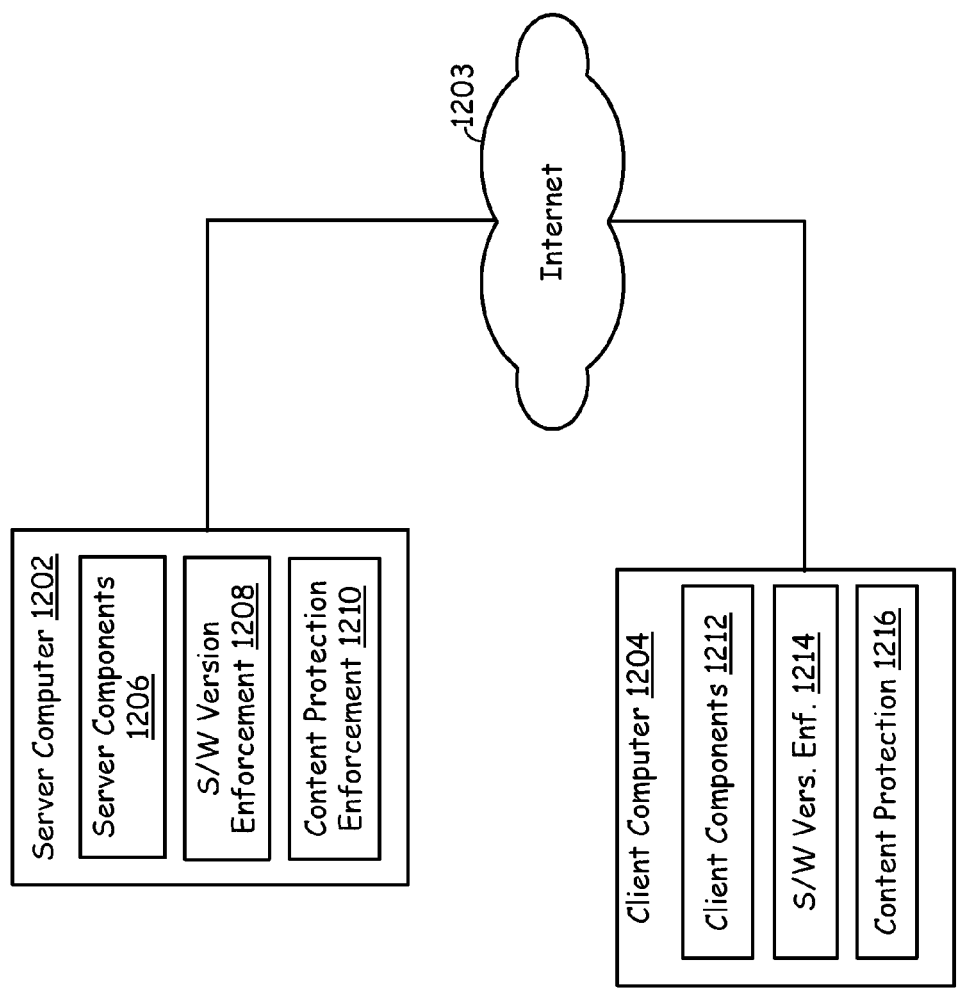
FIG. 12 is a block diagram illustrating another structure that implements one or more embodiments of the present invention.

A client/server implementation that embodies principles of the present invention is described herein with reference to FIG. 12. All principles described herein with reference to FIGS. 1-11 may be implemented by the structure of FIG. 12.

Figure 13:
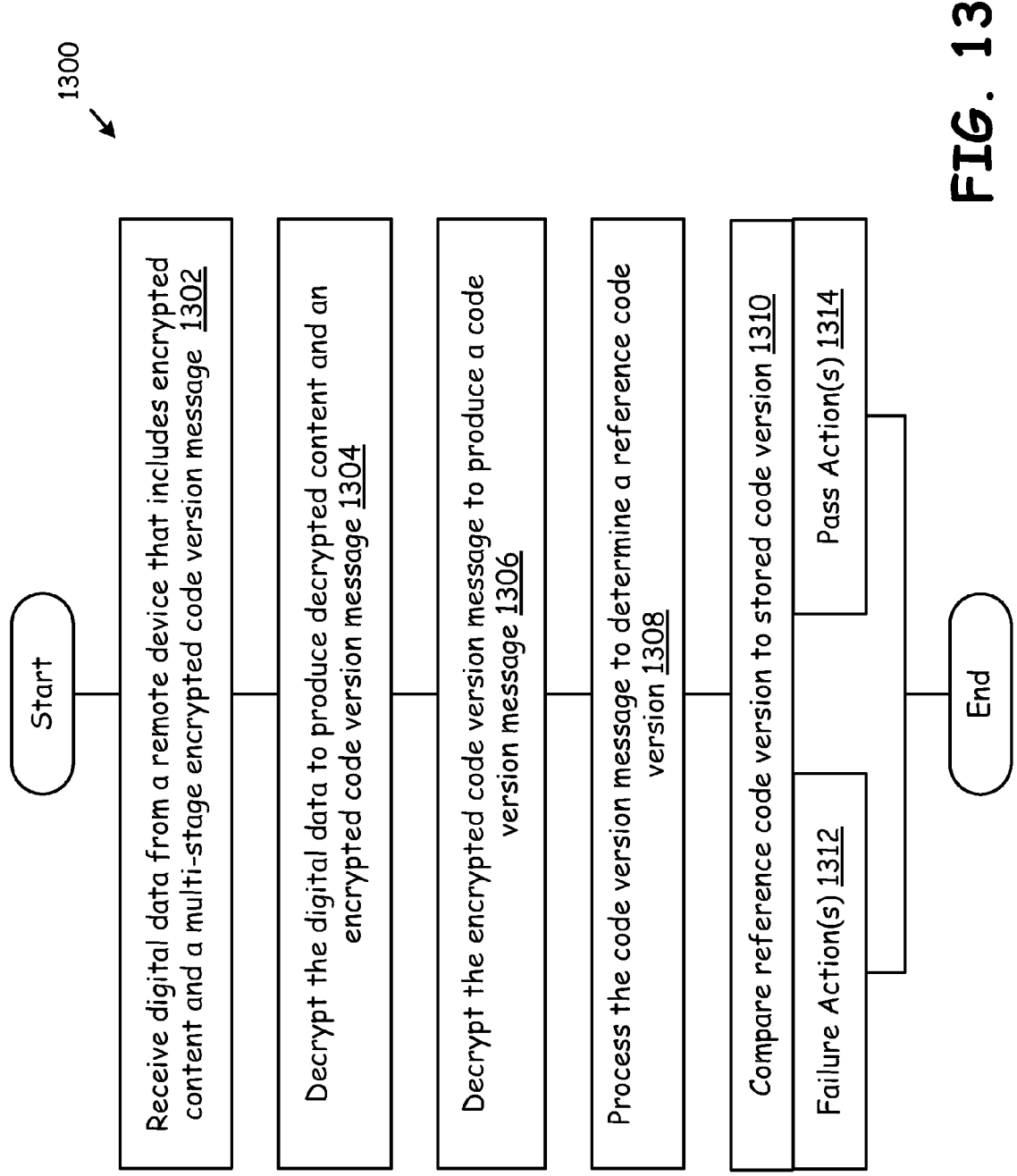
FIG. 13 is a flow chart illustrating operations according to the present invention for securely carrying a code version message in a multi-stage encryption system.
Figure 14:
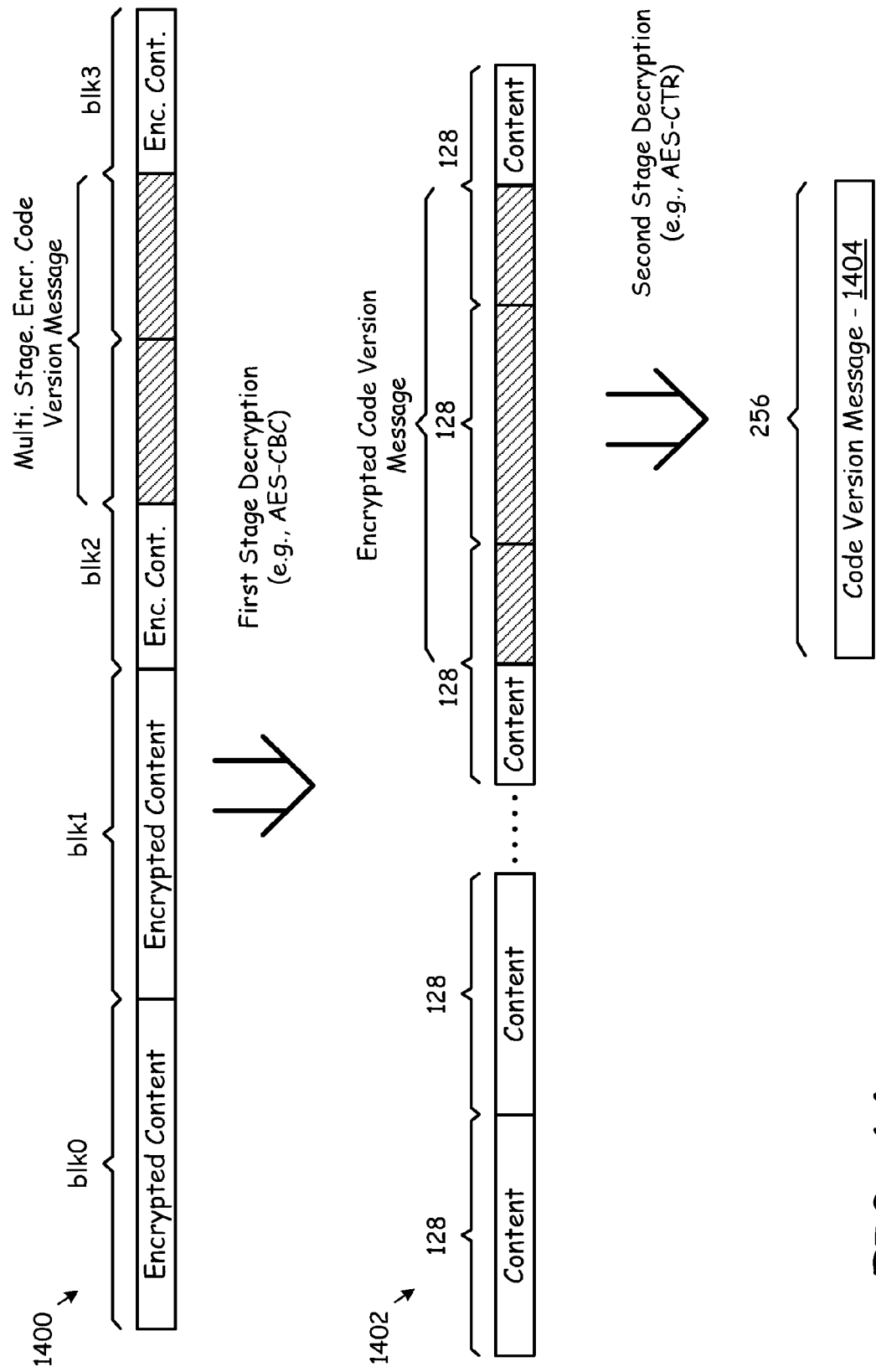
FIG. 14 is a block diagram illustrating further the operations of FIG. 13 as enacted in one or more embodiments.

A technique for receipt and processing of a multi-stage encrypted "code version message" according to one or more embodiments of the present invention is described further herein with reference to FIGS. 13 and 14.

Figure 2:
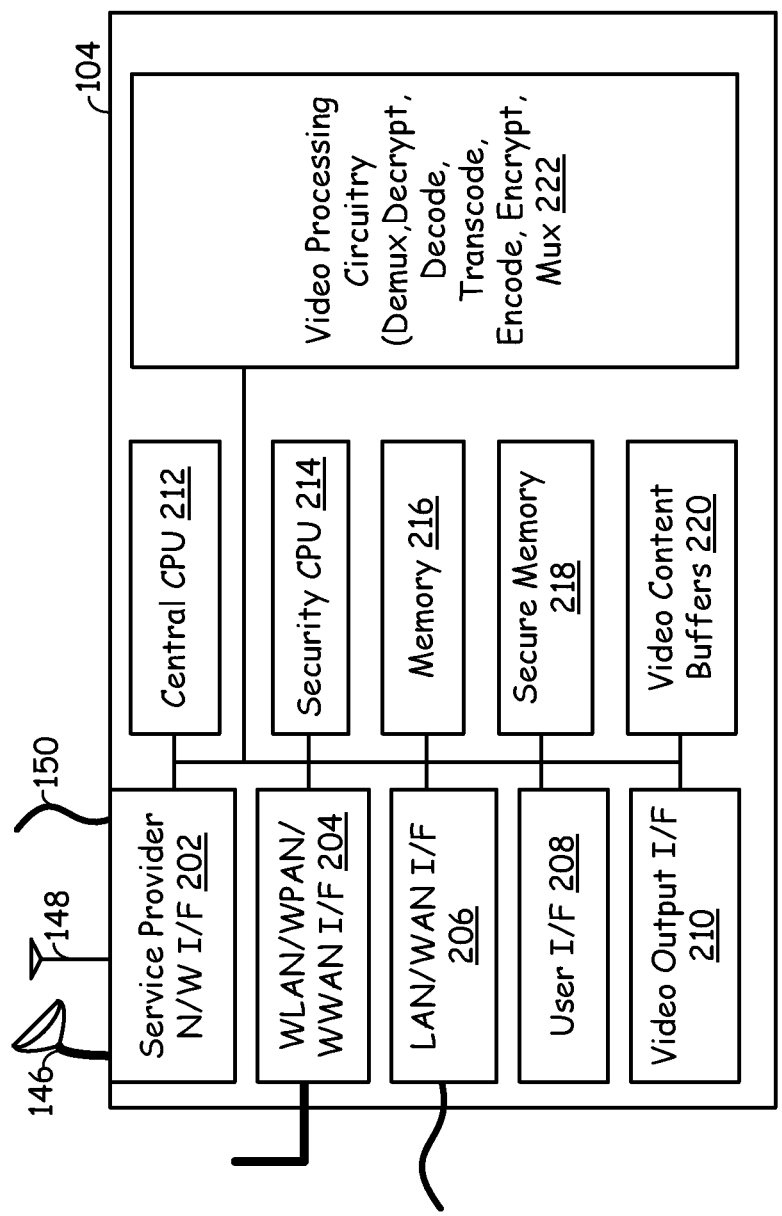
FIG. 2 is a block diagram illustrating a STB constructed and operated according to one or more embodiments of the present invention.

FIG. 2 is a block diagram illustrating a STB constructed and operated according to one or more embodiments of the present invention. The STB 102 includes a service provider network interface 202 that couples to one or more of a satellite dish 146, an antenna 148, and/or media 150 to support communications between the STB 104 and the head end 102 and/or the Internet backbone 106. For example, the STB 104 may receive Internet service via the head end 102 or may have a separate interface to the Internet via one or more different connections. Likewise, the STB 102 includes one or more wireless local area network (WLAN), wireless personal area network (WPAN), and wireless wide area network (WWAN) interface 204. This interface 204 supports communications with one or more WLAN/WPAN/WWANs with which the STB 104 communicates. Further, the STB 104 includes a local area network (LAN)/wide area network (WAN) interface 206 that supports communications between the STB 104 and one or more LANs or WANs.

The STB 104 further includes one or more user interfaces 208, a video output interface 210, a central CPU 212, a security CPU 214, memory 216, secure memory 218, video content buffers 220, and video processing circuitry 222. The user interfaces 208 may include an interface to a keyboard, a mouse, a video display, or other types of devices that allows the user to interface to the STB 104. For example, the STB 104 may couple directly to an audio/video system including a monitor and audio equipment. In such case, the STB 104 services streaming video from the head end 102 to one or more outputs serviced by the STB 104 via the video output I/F 210, the outputs being either directly coupled to audio/video equipment or directly to one or more displays.

The central CPU 212 comprises one or more processing devices such as a system processing unit, a digital signal processor, configurable logic, custom logic, an Application Specific Integrated Circuit (ASIC), Digital Signal Processors (DSPs) or any other type of digital circuitry capable of processing computer software instructions and accessing the various components coupled thereto by a BUS. Security CPU 214 also includes one or more processors, DSPs, or other devices capable of executing software instructions and reading and writing to memory. Generally, the security CPU 214 is for security operations and is does not run non-secure software programs, such as Internet Browsers and user programming, i.e., the security CPU 214 is closely coupled by devices of a subscriber network.

Memory 216 includes one or more of DRAM, SRAM, ROM, PROM, optical memory, magnetic memory, flash memory, or any other type of memory capable of storing computer software instructions and/or data and providing access thereto. The memory, in some embodiments, includes both volatile memory and non-volatile memory. Typically, a code version and other reference data would be stored in non-volatile memory, so that it would remain intact during power down. Secure memory 218 has a similar structure to memory 216 but may have its access limited by security CPU 214. Video content buffers 220 serve to store video content as it is received or transmitted by the STB 104. Video processing circuitry includes one or more components that are operable to demultiplex, decrypt, decode, transcode, encode, encrypt, and/or multiplex streamed video and/or audio content.

According to another aspect of the present invention, digital content that is downloaded to the STB 104 is only made available to the central CPU 212 if in indicia that such content should be made available is included with one or more messages received by the STB 104. In such case, the indications may be received in an ECM or another message received by the STB 104 or client device, or any message conveyed by the head-end which also transmits keys. By tying the code version and/or content access rights to the key delivery system, embodiments of the present invention ensure that any attempt to bypass head end 102 commands will result in an inability to decrypt content.

The teachings of the present invention may also be applied to devices such as CableCards, which may receive information from the head end 102 which is tied to Copy Protection (CP) key exchange with the STB 104 via a secure channel. These teachings may also be applied to IP delivery systems, which transmit keys via secure messages. These principles and operations will be described further with reference to FIGS. 6 and 7 herein as examples.

According to another aspect of the present invention, digital content that is downloaded to the STB 104 is only made available to the central CPU 212 if an indicia that such content should be made available is included with one or more messages received by the STB 104. In such case, the indications may be received within the encrypted content stream as a special supplemental message, e.g. elementary stream user data in MPEG-2 video, or Supplemental enhancement information (SEI) message in H.264 video, received by the STB 104 or client device. A content descrambler may securely decrypt this special code version message and store it in a secure register or memory, which can only be accessed by the security CPU 214. To ensure the robustness of the mechanism, this message may always be inserted in the critical coding structure of the content, e.g. along with the video sequence header, I-picture header, etc. The secure register or memory only updates the change of the code version message. These teachings will be discussed further with reference to FIGS. 13 and 14. As is shown in these FIGS., content is segmented into blocks for encryption. A code version message is inserted in such a way that, for each stage of encryption/scrambling, a part of the code version message will be always encrypted together along with the content in one encrypted block. This ensures that any attempt to bypass the code version message will make the content undecodable. This also enables multi-stage transcryption to support secure code version updates.

According to another aspect of the present invention, the security CPU 214 operates to preclude access by the central CPU 212 to protected data operated upon by a transcoder of the video processing circuitry 222 during the transcoding process. These aspects of the present invention will be described with reference to FIGS. 8-11 herein. According to yet another aspect of the present invention, the central CPU 212 and security CPU 214 of the STB 104 operate in communication with one another to protect content that is downloaded to the STB from either the service provider device 102 or another device communicatively coupled to the STB 104.

Figure 3:
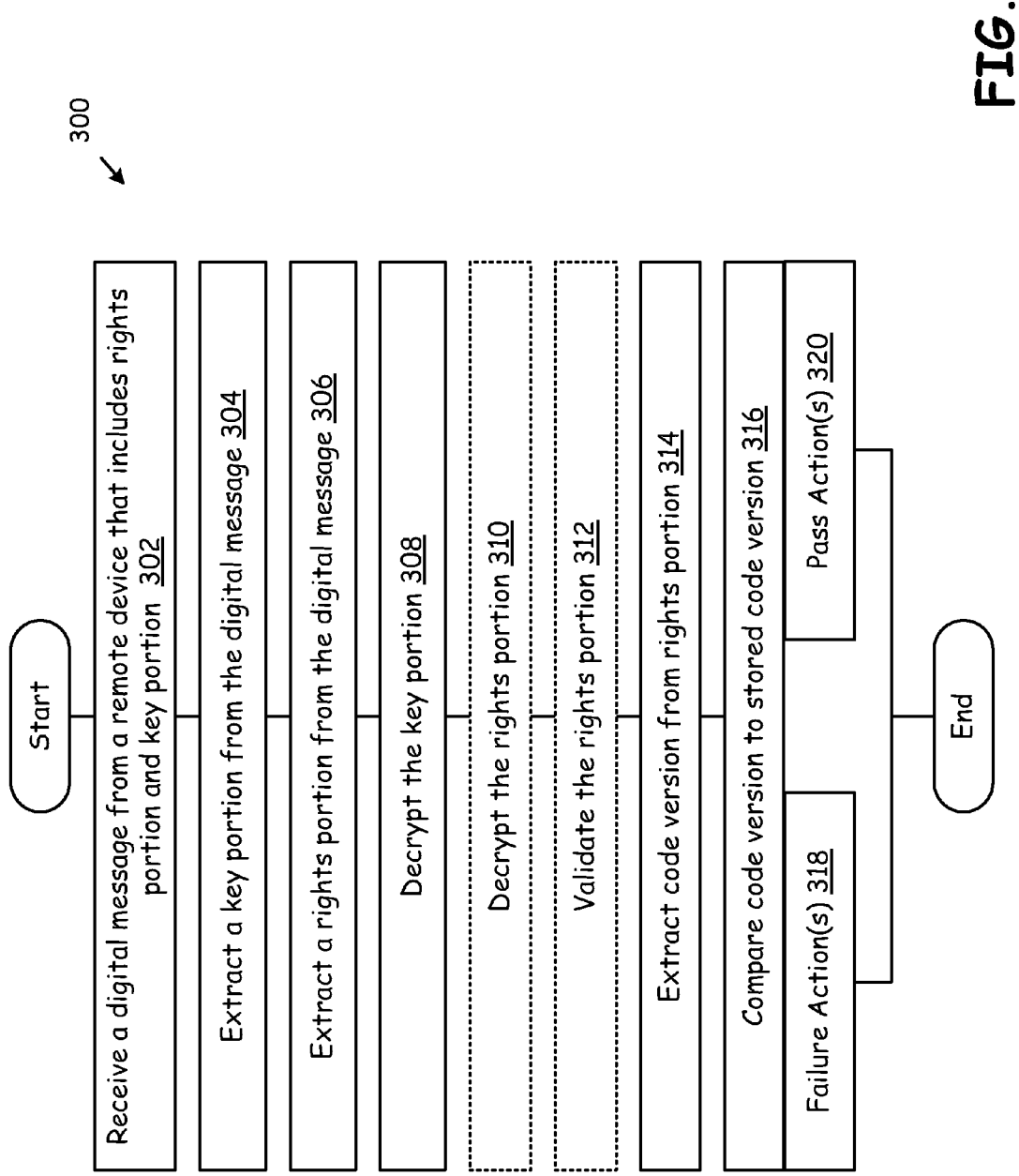
FIG. 3 is a flowchart illustrating operations according to one or more embodiments of the present invention.

FIG. 3 is a flowchart illustrating operations according to one or more embodiments of the present invention. The operations 300 of FIG. 3 are performed by the STB 104 in cooperation with the service provider device 102 of FIG. 1. With another implementation, the operations 300 of FIG. 3 are performed by the system 1200 of FIG. 12. The operations 300 of FIG. 3 serve to guarantee or determine whether or not valid software instructions exist on the STB 104 (or other client device).

Operations 300 commence with the STB receiving a digital message from a remote device that includes a rights portion and a key portion (step 302). The remote device may be the head end 102 of FIG. 1 or another server-type device. The structure of the digital message is described further with reference to FIG. 4. With the embodiment of FIG. 4 in particular, the digital message includes a key portion that relates to the decryption of streamed audio and/or video content received from the STB. The rights portion is a portion of the digital message that is subsequently used to validate software that is stored on the STB. With other embodiments, the rights portion relates to the decryption of other types of data transmitted to the client device.

Operation 300 continues with the STB extracting a key portion from the digital message (step 304). Then operation continues with the STB extracting a rights portion from the digital message (step 306). The digital message may be an Entitlement Control Message (ECM) that the head end 102 sends to the STB 104. Some systems may not use ECMs. In CableCard systems, the digital message may be sent by the head-end embedded in the encrypted data, then extracted by the CableCard, and conveyed to the STB 104 using a secure channel at the same time as the CP key. This conveyance to the STB 104 would be seamless, such that interfering with the rights sent to the STB 104 would also prevent the CP key from being loaded. In IP delivery systems, the rights field may also be tightly encrypted with the content decryption key, to protect it in the same manner as for CA. The teachings of the present invention may be applied to all content and key delivery mechanisms, regardless of the source or delivery method of the content.

The digital message may be routed within the STB 104 via a smart card, via CableCard using secure channel, or by any other means to the security processor 214 previously described with reference to FIG. 2. Conventional ECMs include a key, which is later used for content decoding purposes. According to the present invention, a rights field is added to the ECM or other message sent from the head end 102 to the STB 104. This rights field is added in such a way that the key and the rights are inseparable in the encrypted domain, such that interfering with the delivery of the rights field to the security processor will also interfere with the key delivery.

Operation 300 continues with the STB decrypting the key portion of the digital message (step 308). Then, operation 300 includes the STB decrypting the rights portion of the digital message (step 310). As will be further described with reference to FIG. 4, the rights portion may be encrypted based upon the key portion. Operation 300 continues with the STB validating the rights portion of the digital message (step 312). When the rights portion arrives in an encrypted format, the STB first decrypts the rights portion 310 and then validates the rights portion at step 312 based upon its contents.

Operation 300 continues with the security processor or logic of the STB extracting a code version from the rights portion of the digital message (step 314). The security processor or logic then compares the code version to the stored code version that was stored in a secure memory within the STB (step 316). Based upon the operation of step 316, the security processor or logic determines whether or not the code version of the code implemented on the STB is accurate. Upon a favorable comparison, the comparison at step 316 results in a pass action (step 320). In such case, when the code version is validated at step 316, normal operations of the STB are enabled for subsequent processing of programming streamed to the STB 104 from the head end.

Upon a failure action at step 318 as determined based upon the comparison of the code version to the stored code version at step 316, the STB executes an error action. This error action may be sending a message to the head end 102 (or other service provider device) for software instruction reloading to the STB. Other interactions may include rebooting the STB and/or disabling the decryption of digital content of the STB. In such case, by having the unfavorable comparison of the stored code version to the code version determined from the digital message, the STB may be operated to protect content streamed thereto.

As will be described further with reference to FIG. 4, the rights portion of the digital message may include an integrity portion and the code version. The integrity portion may be a known constant that has been used to form a segment of the rights portion and other fields that the STB uses to validate that the rights portion of the digital message is accurate and may support the subsequent operations 300 of FIG. 3. The integrity portion may also involve any combination of digest and signature over the key/rights delivery message that will be apparent to one of ordinary skill in the art.

Figure 4:
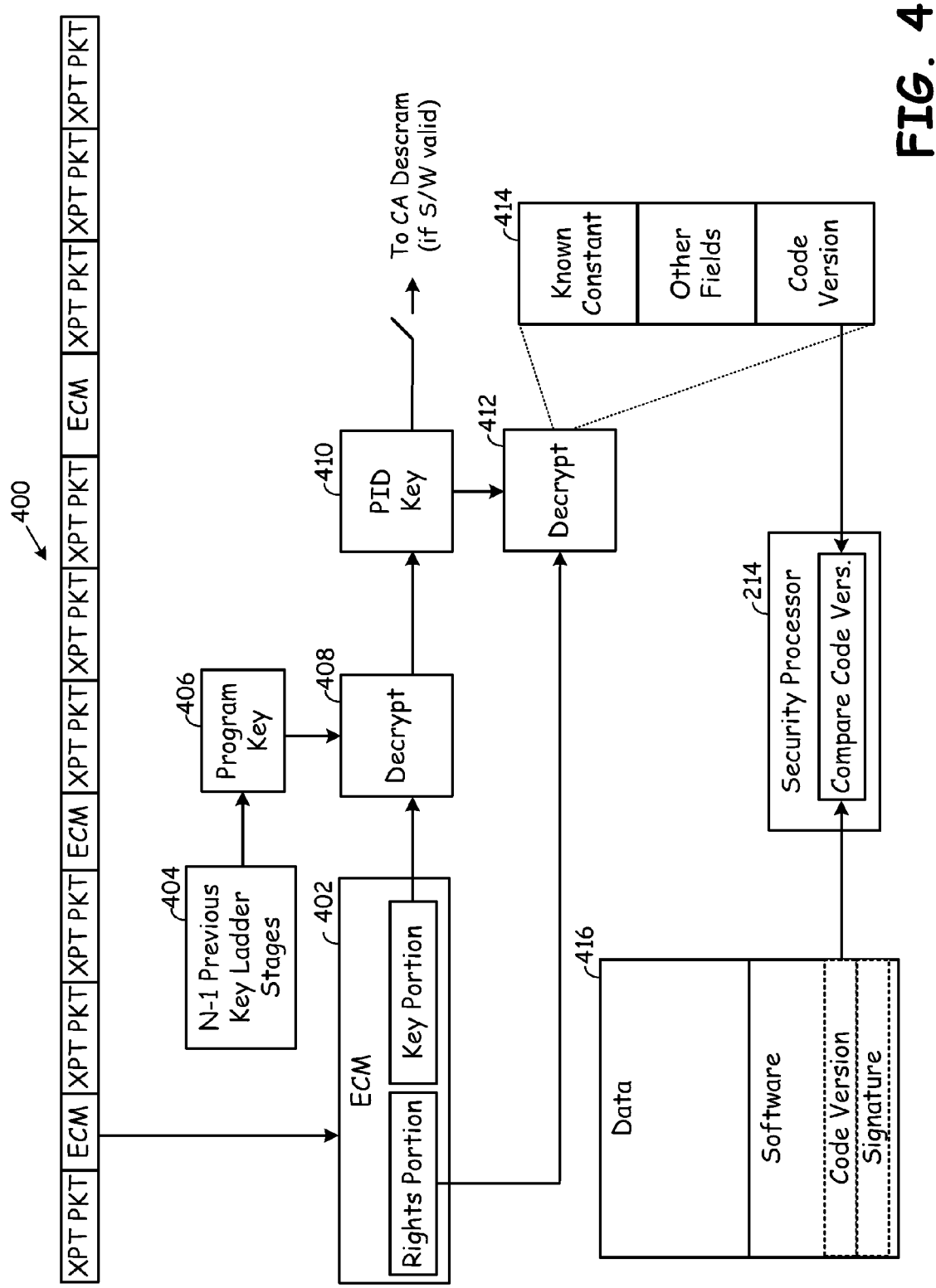
FIG. 4 is a block diagram illustrating the structure and operations of one or more embodiments of the present invention.

FIG. 4 is a block diagram illustrating the structure and operations of one or more embodiments of the present invention. Streamed content 400 is received by the STB. The streamed content includes transport packets (XPT PKTs) and the ECMs or other key delivery messages. As is illustrated, the streamed content 400 includes XPT PKTs that are interspersed with the ECMs. Upon receipt of an ECM, the ECM is divided into the rights portion and the key portion at 402. The key portion is then decrypted with operation 408 based upon a program key that is produced by n−1 previous key ladder stages functionality 404. The decryption operation uses the program key 406 to decrypt the key portion of the ECM 402 at operation 408. Produced by the decryption operation step 408 is a program identification (PID) key 410. With the embodiment of FIG. 4, the PID key 410 is used to decrypt the rights portion of the ECM 402 via decryption operation 412. These operations may also be applied to a system in which data arrives in non-transport stream format, such as may occur over an IP delivery system with other embedded key messages.

With the embodiment of FIG. 4, the rights field of the ECM 402 may be a separately encrypted field. For example, with the key portion encrypted using AES, the key portion of the ECM 402 is 128 bits wide, which is a native AES block size. The rights portion of the ECM 402 uses up a second 128 bit word. However, because the rights field is in a separately encrypted field from the key portion, it may be possible for a hacker to remove part of the ECM 402 (the rights field) and replace it with a rights field from a previous ECM, while still retaining the key portion of the ECM 402. Doing this results in bypassing security protection and allowing a previous code version to be assumed.

According to another aspect of the present invention, the head end 102 encrypts the rights portion of the ECM 402 using an ECM key. The STB 104 then decrypts the key portion according to the operations of FIG. 4. With the decryption performed at step 412, what is produced is a decrypted rights portion 414. The decrypted rights portion includes a known constant, other fields, and a code version. The known constant is compared to a previously determined known constant to first validate the rights portion of the ECM 402. Then, with the decrypted rights portion 414 validated, security processor 214 compares the code version of the decrypted rights portion of the ECM 402 with a code version extracted from memory 416. The security processor 214, after making this comparison, then initiates either recovery operations or successful comparison operations to support further operations of the STB.

According to another aspect of the present invention, Cipher-Block Chaining (CBC) or any other cross-word chaining may be used to tie the key portion to the rights portion. For example, the key delivery message may be encrypted with AES-CBC across both the key and the rights portion/words. Then, substituting the rights portion of one key message with that of another key message will break the chain, and will result in unusable keys. By doing so, interception and attempted replacement of the rights portion will cause the key to be unusable to decode content.

Figure 5:
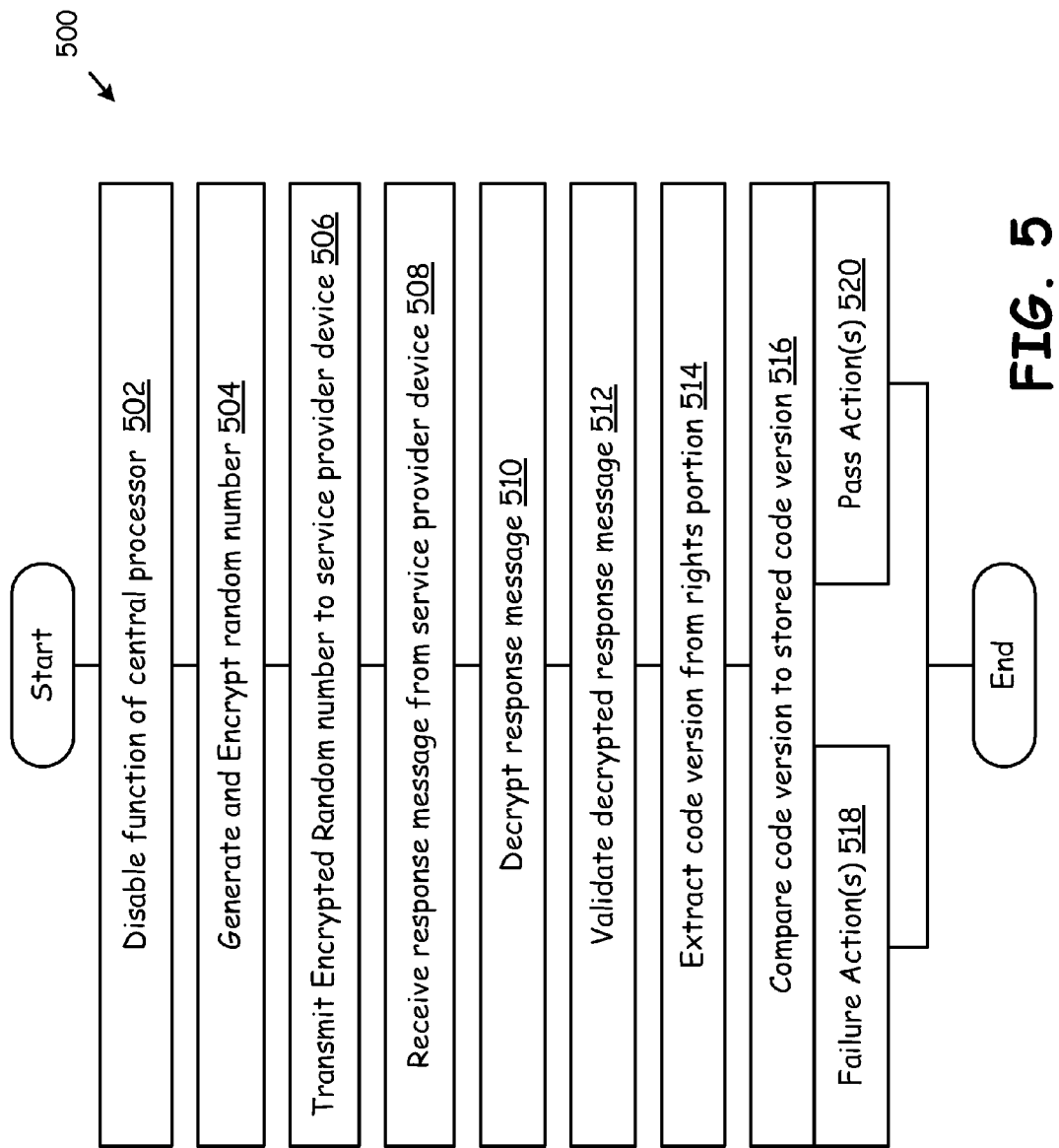
FIG. 5 is a flowchart illustrating operations according to one or more embodiments of the present invention.

FIG. 5 is a flowchart illustrating operations according to one or more embodiments of the present invention. Operations of an STB having a central processor and a security processor are illustrated. However, with other embodiments, the operations of FIG. 5 may be performed by a client computer interacting with a server computer. With the embodiment 500 of FIG. 5, a security processor 214 controls or limits the operation of a central CPU 212, as was illustrated in FIG. 2. Operation commences at start up, reboot, or power up. In a first operation, after restart, reboot, or power up, the security processor disables a function of the central processor (step 502). This function disablement includes precluding the ability of the STB to decode or otherwise process protected digital content.

Operation continues with the security processor generating and encrypting a random number (step 504). The security processor then initiates transmission of the encrypted random number to a service provider device such as the head end 102 (step 506). The security processor then waits and receives a response message from the head end (at step 508). The security processor then decrypts the response message (step 510). The STB then validates the decrypted response message (step 512). Validating the encrypted response message may include multiple methods such as signature, digest comparison, and other methods known to those skilled in the art.

Then, with the response message validated, the security processor extracts a code version from the rights portion (step 514). The security processor then compares the code version of the extracted version from the response message to a stored code version (step 516). Upon a favorable comparison, the security processor will execute a pass action (step 520). If the comparison at step 516 was unfavorable, the security processor executes a fail action (step 518). As was the case with the operations of FIG. 3, a pass action includes fully enabling the central CPU to perform decoding and decryption of streamed content for storage and/or presentation to a user. An error action as implemented at step 518 may include sending a message to a service provider to initiate software instruction reloading to the STB.

Figure 6:
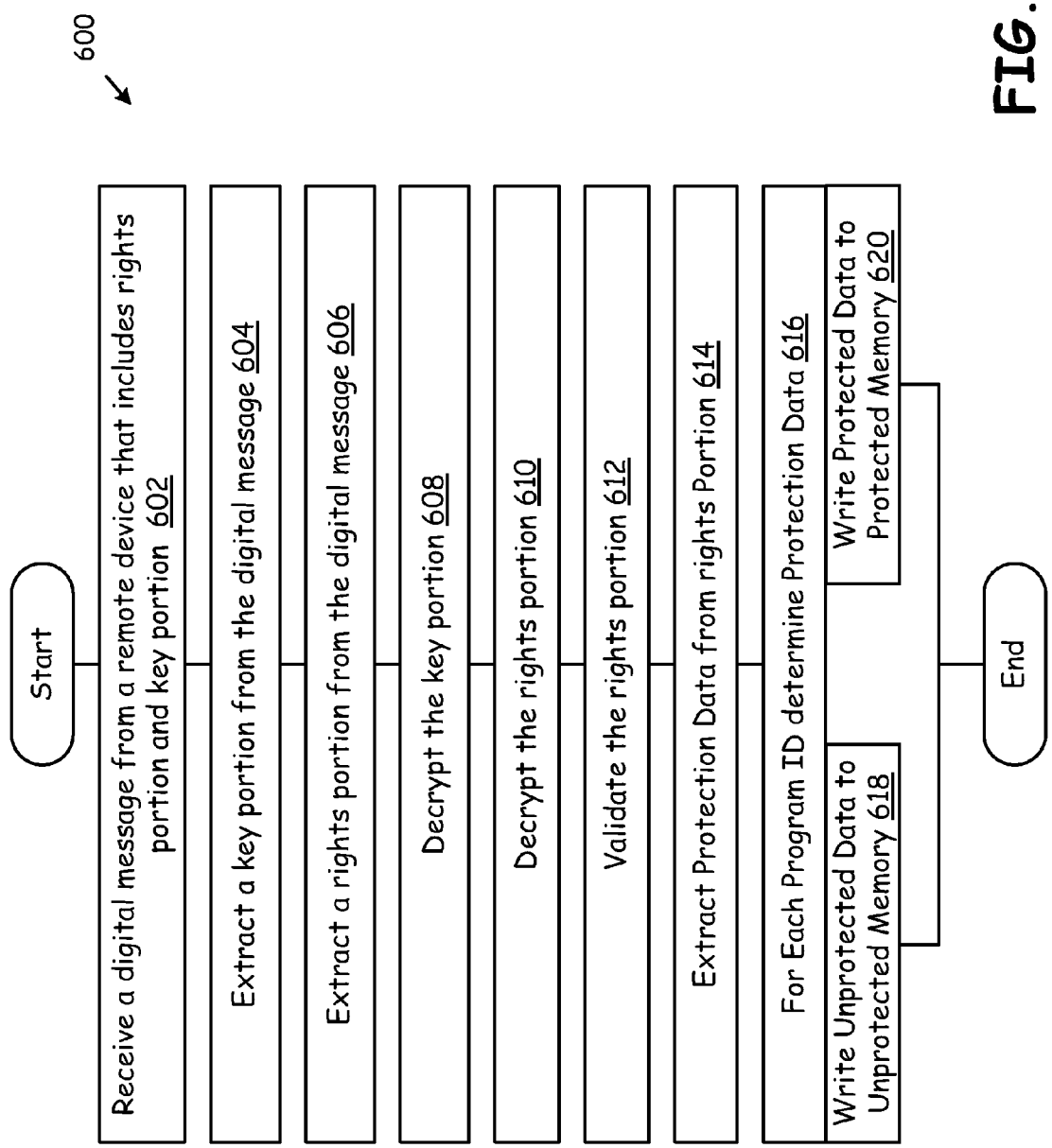
FIG. 6 is a flowchart illustrating operations for content protection according to one or more embodiments of the present invention.

FIG. 6 is a flowchart illustrating operations for content protection according to one or more embodiments of the present invention. The operations 600 of FIG. 6 may be performed by the STB 104 in cooperation with the service provider device 102 of FIG. 1. Likewise, the operations 600 of FIG. 6 may be performed by a client device that is in communication with a server device. Such combination is subsequently described herein with reference to FIG. 12. The operations 600 of FIG. 6 may be performed by other devices as well without departing from the scope and spirit of the present invention.

The operations 600 of FIG. 6 commence with the STB receiving a digital message from a remote device, the digital message including a rights portion and a key portion (step 602). A security processor or logic of the STB then extracts the key portion from the digital message (step 604). Next, the security processor or logic extracts a rights portion from the digital message (step 606). The digital message described with reference to FIG. 6 may be an ECM as was previously described herein with reference to FIG. 4, or may be any message that conveys content delivery keys to the STB.

Operations 600 of FIG. 6 continue with the security processor or logic decrypting the key portion of the digital message (step 608). In decrypting the key portion at step 608, the security processor or logic uses a decryption scheme that is consistent with the encryption scheme used by the head end or server that created the digital message. One example of such a decryption scheme will be described herein with reference to FIG. 7. The security processor or logic then decrypts the rights portion (step 610). Resultantly, after executing steps 602-610, the security processor or logic has generated a key portion that may be subsequently used to descramble content provided to the STB from the head end or other remote device. Further, the security processor or logic has also generated a key portion that may be subsequently used to protect portions of the digital content that is received by the STB.

Next, the security processor or logic validates the rights portion (step 612). With the operations of step 612, the security processor or logic uses additional steps to ensure that the rights portion of the digital message is valid and will correctly serve to be used to right protect digital content as it is received by the STB. The security processor or logic then extracts program ID protect data from the rights portion of the digital message (step 614). While FIG. 6 refers to program ID protect data, the terminology content identifier or content identifiers may be used herein. As the reader will appreciate, content received by the STB may be segments of a larger content group. For example, the content may include a plurality of streams of video and/or audio data. Further, the content may be one or more data files being downloaded to the STB, a software program, or another type of data being downloaded to the STB. This data will be divided into smaller groups of data that will be transmitted to the STB in data segments. These data segments may be identified to belong to a larger group of data. According to embodiments of the present invention, each of these data segments may have associated therewith a content identifier. The content identifier may be a Program ID, File ID, data group ID, or another identifier, which identifies the incoming data as associated with a particular ID. Depending upon the ID of the content, operations according to the present invention will either protect or not protect the content from the central CPU. The operations 600 of FIG. 6 apply to identified content, independent of its content type.

In one particular operation of the STB according to the method 600 of FIG. 6, the STB receives digital messages and digital content. The digital messages, when processed according to steps 602-614, produce protection data for at least some PIDs of programming received by the STB. The protection data is an indicator of whether the decrypted content belonging to each PID (or protected stream or other received data, i.e., IP data) should be allowed into host CPU accessible area. For example, as will be subsequently described with reference to FIG. 7, the STB may be operable to receive and descramble a plurality of audio/video streams from the head end 102. Each of these audio/video streams has an associated PID or other stream designator therewith. Based upon the PID or other stream designator, and the rights field associated with the key, the STB is operable to uniquely process each of the audio/video streams. Thus, at step 616, the STB is operable to determine protection data for at least some of a plurality of audio/video streams received by the STB. Of course, the STB may only receive a single audio/video stream and will process that single audio/video stream according to the protection data corresponding to the particular program ID.

For each audio/video stream received by the STB, upon determining that the audio/video stream is not protected, the STB will write the unprotected data to unprotected memory (step 618). Further, for each program ID/PID associated with an audio/video stream that is right protected, the STB will write the protected data to a protected portion of memory (step 620). In one particular operation, the STB will scramble the protected data prior to writing the protected data to the protected portion of the memory.

Subsequent to the operations 600 of FIG. 6, the STB may allow access to the protected portion of the memory only to audio/video processing resources of the STB and deny access to the protected portion of the memory to the central CPU 212 of the STB 104. In such case, the STB 104 includes hardware, e.g., security processor, and/or software safeguards to limit access to memory to the various processing resources within the STB.

As was the case with the embodiment of FIG. 4, the rights portion of the digital message may include a validation portion that the security processor or logic of the STB 104 uses to validate the rights portion. This validation portion may include a known constant and/or other fields that verify that the rights portion of the digital message is in fact valid and should serve to support the operations of the present invention. Other methods of validation will be apparent to those skilled in the art.

Figure 7:
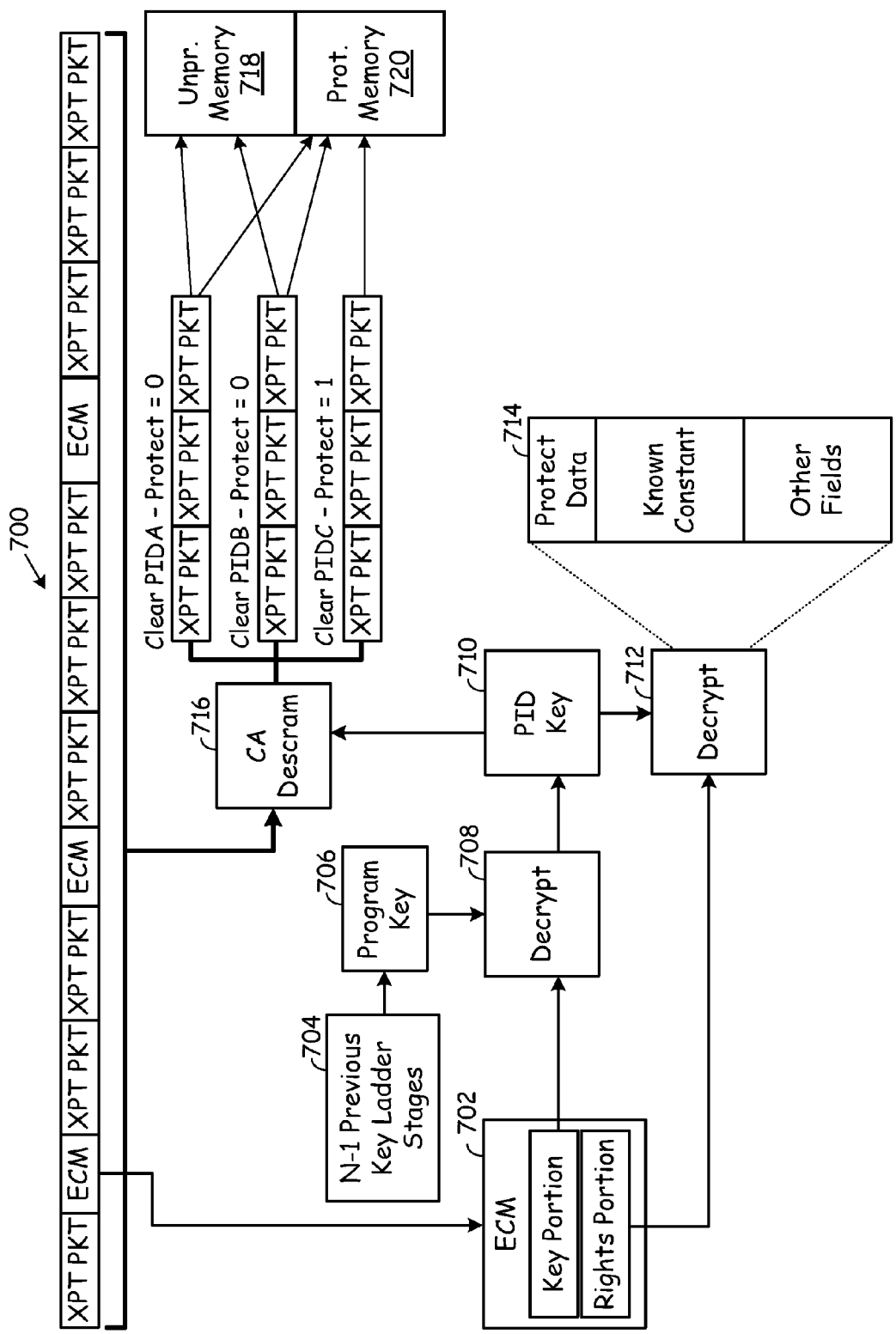
FIG. 7 is a block diagram illustrating functionally the operations of one or more embodiments of the present invention to protect digital content upon receipt by an STB or client device.

FIG. 7 is a block diagram illustrating functionally the operations of one or more embodiments of the present invention to protect digital content upon receipt by an STB or client device. A Conditional Access (CA) digital stream 700 is received by the STB, which includes interspersed digital content (XPT PKTs) and digital messages (ECMs), which is transmitted by a head end 102 or server computer. The STB or client device extracts the digital messages from the streamed content and produces the digital message 702, which includes a key portion and a rights portion. The digital content of the streamed structure 700 is conditional access (CA) audio/video content that is generally known within the audio/video art.

The ECM 702 includes a key portion, which is decrypted by functional decryption blocks 708 using a program key 706 that was produced by a key ladder stages functional device 704. The decrypted key portion is decrypted by a functional block 708 to produce a PID key 710. The PID key 710 is used by functional decryption block 712 to produce a decrypted rights portion 714. The decrypted rights portion 714 includes one or more PID protect data IDs or bits corresponding to one or more streams of digital content received by the STB. Each of the streams of the digital content includes a corresponding PID.

The PID key 710 is also used by functional block 716 for CA descrambling of a plurality of audio/video streams. Based upon the one or more protection bits of the decrypted rights portion 714, the STB streams the digital content into either unprotected memory 718 or protected memory 720. With the example of FIG. 7, program IDs "A" and "B" are unprotected with their protection bit equal to "0", while the streamed content relating to program ID "C" is protected with its protection bit set to "1". In such case, the audio/video streams corresponding to program IDs "A" and "B" may be streamed to either the unprotected memory 718 or the protected memory 720 for subsequent access by the central CPU 212, the security CPU 214, and/or video processing circuitry 222 of the STB 104 of FIG. 2.

Because the audio/video stream having the program ID "C" has a protection bit equal to "1", the digital content corresponding to the program ID "C" stream is only written to protected memory 720 for subsequent access only by resources of the STB 104 other than the central CPU. In some embodiments, the protected memory 720 may only be accessed by video processing circuitry 222 of the STB 104 of FIG. 2. In other embodiments, other components of the STB may also access the protected memory 720. Further, as was previously described, according to one embodiment of the present invention, the digital content corresponding to the program ID "C" may be scrambled prior to its writing to the protected memory 720. Further, in another embodiment, digital content corresponding to PID "A" and PID "B" are only written to the unprotected memory 718 and the digital content corresponding to PID "C" is only written to protected memory 720. The optional writing illustrated in FIG. 7 is shown to indicate that unprotected content may be written anywhere in the memory while protected content can only be written to that portion of memory 720 that is not accessible by the central CPU 212 of the STB.

Figure 8:
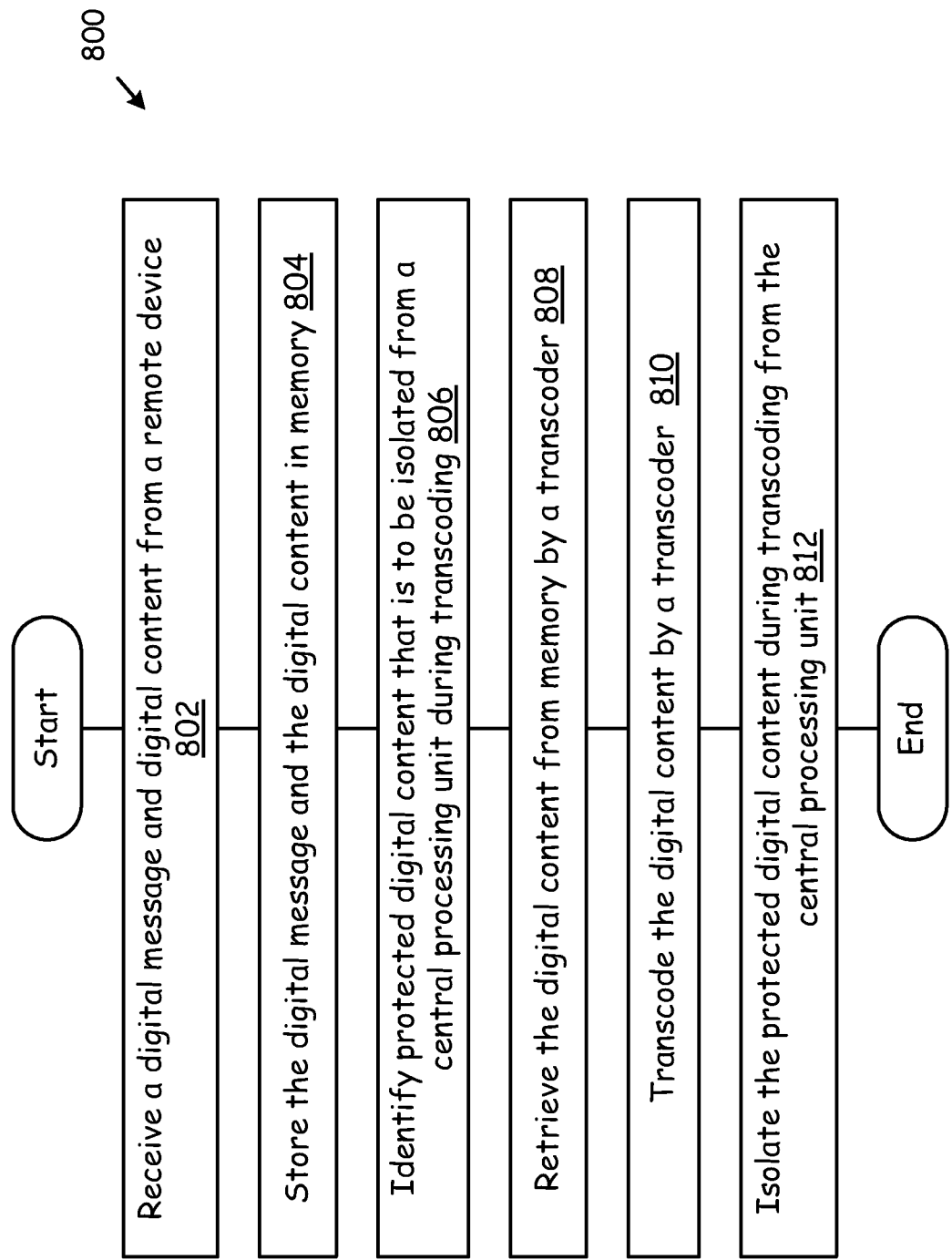
FIG. 8 is a flowchart illustrating an operation according to an embodiment of the present invention for protecting digital content during transcoding.

FIG. 8 is a flowchart illustrating an operation according to an embodiment of the present invention for protecting digital content during transcoding. The operations 800 of FIG. 8 begin with a STB or client device receiving a digital message and digital content from a remote device (step 802). According to one embodiment of the present invention as was described previously herein with reference to FIG. 1, the receiving device is an STB 104 and the transmitting device is a head end 102. According to an embodiment that will be described further herein with reference to FIG. 12, the transmitting device is a server 1202 and the receiving device is a client 1204. Each of the server 1202 and the client 1204 is a digital computer that is coupled to the Internet.

Referring particularly to FIG. 8, the receiving device is operable to store the digital message and the digital content in memory (step 804). A security processor, for example, of the receiving device then identifies protected digital content that is to be isolated from a central processing unit during transcoding (step 806). As will be described further herein with reference to FIGS. 9-11, the transcoder is a component of a client computer or STB. The digital content is received by the device in a scrambled format, according to an H.264, MPEG, AVG, or another encoding or encryption standard. The scrambled content is then retrieved from memory by a transcoder of the device (step 808). When retrieved from memory, the digital content is still in its scrambled format. However, when transcoding of the digital content by the transcoder (step 810), the digital content is first descrambled prior to transcoding. Thus, during the transcoding process digital content is in an unprotected format which could be accessed by the CPU and intercepted in that format.

Thus, according to the present invention, the protected digital content that was identified in step 806 is isolated during transcoding from the CPU (step 812). The manner in which the protected digital content is isolated from the CPU at step 812 may take differing forms according to various embodiments of the present invention. According to a first embodiment, a security processor 214 precludes access of those portions of memory in which the descrambled content is stored by the transcoder during the transcoding process. In another embodiment, the transcoder itself is controlled to preclude writing the digital content in its unscrambled format into those portions of memory that are accessible by the CPU. For example, the transcoder may use secured buffers to store the digital data in its descrambled format during the transcoding process. These secure buffers are not accessible by the CPU. Further, a direct memory access (DMA) engine of the transcoder may be operated such that the digital content during transcoding in its unscrambled format is not stored in memory accessible to the CPU. In other embodiments, other data movement engines within the transcoder are protected from central CPU access, so that they cannot be used to move data from secure and non-secure regions.

According to another aspect of the present invention, the output of the transcoder is forced to go to secure buffers by a security processor or hardware, where such security buffers cannot be read by the CPU. Still further, transcoder output buffers are only accessible by hardware engines or local CPUs other than the central CPU to keep the unprotected digital content from the central CPU access. Still further, the clear transcoded data prior to rescrambling is forced to be rescrambled by the transcoder during the transcoding process when written to memory. Even though this embodiment will require multiple steps for scrambling and descrambling during the transcoder process it would protect the digital content during the transcoding process from interception by the CPU.

FIG. 9A is a flowchart illustrating operations for protecting digital content from the CPU during the transcoding process. The operations 900 of FIG. 9A begin with a security processor or other logic of the STB 104 or client device determining a protected portion of memory in which the transcoder stores non-scrambled data during transcoding (step 902). Then, the security processor or other logic of the STB precludes access by the CPU to the protected portion of the memory during transcoding (step 904).

FIG. 9B is a flowchart illustrating operations of an STB or client device in allocating protected memory for use in the transcoding process of the STB or client device. Operations 950 commence with a security processor or other logic of the STB or client device allocating protected buffers in which the transcoder stores non-scrambled data during the transcoding process (step 952). Then, operation continues with the security processor or other client or STB device precluding the central processing unit access to the protected buffers during transcoding (step 954).

FIG. 10 is a flowchart illustrating particular operations for identifying content to be protected from access by a CPU during transcoding according to one or more embodiments of the present invention. The operations 1000 of FIG. 10 commence with the STB or client device receiving a digital message from a remote device that includes a rights portion and a key portion (step 1002). The STB then extracts a key portion from the digital message (step 1004). The STB then extracts a rights portion from the digital message (step 1006). The operations of FIG. 10 are described in part in the block diagrams of FIGS. 4 and 7, however with particular applicability to determining or identifying protected content.

The STB or client device then decrypts the key portion of the digital message (step 1008). Then, the STB decrypts the rights portion of the digital message (step 1010). In one particular aspect of the present invention, the decrypted key portion may be required to decrypt the rights portion. In such case, the operation of step 1008 is used to decrypt a key portion and produce a decrypted result. Then, the rights portion is decrypted using the decrypted result to produce the decrypted rights portion.

Then, the rights portion is optionally validated based upon its content. Referring to FIGS. 4 and 7, the decrypted rights portion may include a known constant or other validation field that is used to validate the rights portion at step 1012. After validation, the rights portion may then be used to extract protection data regarding the digital content received by the STB or client device (step 1014). In one particular embodiment, a plurality of programs, each with a particular PID, is received by the STB or client device for processing. Further, in the rights portion, there is a plurality of corresponding protection bits or data that corresponds to the plurality of PIDs of the digital content. In such case, then each of the PIDs operated upon by the STB or client device have a corresponding protection indication via a protection bit or other data. Finally, based upon the information received in the rights portion of the digital message, the security processor or other device precludes access to protected PID digital content by the central processing unit during transcoding by the transcoder (step 1016). From step 1016 operation concludes.

FIG. 11 is a block diagram illustrating the structure of a client device or STB that includes structure for protecting digital content during transcoding. The structure 1100 of FIG. 11 includes the central CPU 212, security CPU 214 and a plurality of other components used during the transcoding process as well as during other operations of the device. Digital content is received by transport demux 1102 which separates the transport stream (CA Stream) into a plurality of program streams. This output of the transport demux 1102 is written to compressed data buffer 1104. The compressed data buffer 1104 stores the digital content as it is received in a scrambled format that is not susceptible to piracy or other unauthorized access by the central CPU 212.

The transcoder 1106 performs transcoding of the streamed digital programming that is stored in the compressed data buffer 1104. Operations of transcoder 1106 may be tailored to a particular client device serviced by the STB or client computer prior to their presentation. For example, the transcoder 1106 may receive programming in an HD format as supported by H.264 that is not needed by a pocket TV 114 or PDA 112 that was previously described with reference to FIG. 1. In such case, the transcoder 1106 alters the digital content so that it may be better displayed by such rendering device (TV 114 or PDA 112) or more easily transported thereto with lesser data transport requirements.

Transcoder 1106 includes a decoder 1108 that decodes the digital data. The output of the decoder 1108 is written to a decompressed data buffer 1110. The decompressed data buffer 1110 may store digital content in an unprotected format that is to be precluded from access by the central CPU 212. Direct memory access (DMA) engine 1114 couples to the decompressed data buffer 1110 and other secure buffers 1112. In some operations, the central CPU 212 may have access to the DMA 1114. However, when digital content has been determined to be protected, the security CPU 214 of FIG. 11 will preclude the central CPU from accessing the DMA 1114. Further, other buffers 1128 coupled to the transcoder 1106 that store content in an unprotected format are protected by the security CPU 214 from access by the central CPU 212.

Transcoder 1106 includes encoder 1107 that includes the DMA 1114, multiple sub-clients 1116 and output clients 1118. The multiple sub-clients 1116 and output clients 1118 may include a plurality of differing functioning devices that are employed in the transcoding process. The output of the transcoder 1106 is written to compressed data buffer 1120. The data is read from the compressed data buffer 1120 by hardware read engine 1122. The hardware read engine 1122 produces output that is received by encryption engine 1124 that encrypts the data and writes the data to other buffers 1126. The output of the encoder 1107 may also be written to the other buffers 1128, which are protected by the security processor from the central CPU 212 when storing protected data.

According to another aspect of the present invention, the transcoder 1106 operates on a plurality of programs each of which has a unique program ID (PID). In such case, the central CPU 212 may have access to the unprotected digital content during transcoding by the transcoder 1106 but may be precluded from access to the transcoder 1106 for protected digital content. Thus, the security CPU 214 of FIG. 11 will only precludes access by the central CPU 212 for the transcoding of protected digital content but not unprotected digital content.

According to other operations, the security processor 214 is operable to protect both the transcoder input and the transcoder output from the central processing unit 212. Further, the security processor 214 may be operable to protect at least some of a plurality of buffers 1110, 1112 of the transcoder 1106 from the central processing unit 212 during transcoding. In still other operations the security processor 214 is operable to cause the transcoder 1106 to use memory having particular addresses for storage of intermediate content during transcoding. The security processor 214 may be operable to limit access of the central processor 212 to buffers used by the transcoder 1106 for storage of intermediate transcoding content. The DMA engine 1114 may be operable to encrypt transcoder output before the data is output from a protected portion of memory. In such case, the DMA engine 1114 is under control of the security CPU 214.

FIG. 12 is a block diagram illustrating another structure that implements one or more embodiments of the present invention. The structure of FIG. 12 includes a server computer 1202 and a client computer 1204 that are coupled by the Internet 1203 or another network. The server computer 1202 includes server computer components 1206, software version enforcement functionality 1208, and content protection enforcement functionality 1210. The software version enforcement functionality 1208 and content protection enforcement functionality 1210 were previously described herein and may be implemented by the structure 1200 of FIG. 12.

Client computer 1204 includes client components 1212, software version enforcement functionality 1214 and content protection enforcement functionality 1216. The software version enforcement functionally 1214 and content protection enforcement functionality 1216 perform functions previously described herein and employs structures previously described herein with reference to FIGS. 1-11. Thus, the structure 1200 of FIG. 12 may be performed in any of the various operations previously described herein with reference to FIG. 11 and incorporates structures previously described herein with reference to FIG. 11 to embody the teachings of the present invention.

FIG. 13 is a flow chart illustrating operations according to the present invention for securely carrying a code version message in a multi-stage encryption system. The operations 1300 of FIG. 13 are performed by the STB 104 of FIG. 1, by the client computer 1204 of FIG. 12 or by another computing device that receives remote content and whose code versions are tracked by another computing device. The operations 1300 of FIG. 13 serve to guarantee or determine whether or not valid software instructions exist on the STB 104 (or other client device 1204).

Operations 1300 commence with the STB receiving digital data from a remote device, the digital data including encrypted content and a multi-stage encrypted code version message (step 1302). The remote device may be the head end 102 of FIG. 1 or another server-type device such as the server computer 1202 of FIG. 12. The structure of the digital data and its flow according to the operations 1300 of FIG. 13 are described further with reference to FIG. 14. The encrypted content may be streamed audio data, streamed video data, software, bulk data, or another type of data intended for the STB 104 or client computer 1204.

Operations 1300 continue with a security processor or other logic decrypting the digital data using a first decryption technique, e.g., AES-CBC, to produce decrypted content and an encrypted code version message (Step 1304). Because the code version message was multi-stage encrypted, after its first stage decryption, the code version message is still encrypted according to its second stage encryption format. Operation continues with the security processor or other logic decrypting the encrypted code version message using a second decryption technique, e.g., AES-CTR to produce the code version message in a decrypted format (step 1306). The code version message is stored in a secure register by the security processor or logic so that it cannot be accessed by the CPU. The code version message may be routed within the STB 104 via a smart card, via CableCard using secure channel, or by any other means to the security processor 214 previously described with reference to FIG. 2.

Operations 1300 continue with the security processor or logic processing the code version message to determine a reference code version (step 1308). The operations of step 1308 may include validating the code version message based upon its contents using a technique same/similar as that describe with reference to the prior FIGs.

Operations 1300 continue with the security processor or logic of the STB comparing the reference code version to a stored code version that was stored in a secure memory within the STB (step 1310). Based upon the operation of step 1310, the security processor or logic determines whether or not the code version of the code implemented on the STB is accurate. Upon a favorable comparison, the comparison at step 1310 results in a pass action (step 1314). In such case, when the code version is validated at step 1310, normal operations of the STB are enabled for subsequent processing of programming streamed to the STB 104 from the head end. Upon a failure action at step 1312 as determined based upon the comparison of the reference code version to the stored code version at step 1310, the STB executes an error action. This error action may be sending a message to the head end 102 (or other service provider device) for software instruction reloading to the STB. Other interactions may include rebooting the STB and/or disabling the decryption of digital content of the STB. In such case, by having the unfavorable comparison of the stored code version to the code version determined from the digital message, the STB may be operated to protect content streamed thereto.

FIG. 14 is a block diagram illustrating further the operations of FIG. 13 as enacted in one or more embodiments. With the embodiment of FIG. 14, a STB 104, client computer 1204, or other computer computing device receives digital data from a head end 102, a server computer 1202, or another computing device. This digital data 1400 includes encrypted content and a multi-stage encrypted code version message. This digital data 1400 arrives in a format having a plurality of blocks of encrypted content and multiple blocks of combined encrypted content and the multi-stage encrypted code version message. With the example of FIG. 14, the digital data 1400 includes encrypted content occupying blocks 0 and 1 of the incoming data set and encrypted content and portions of the multi-stage encrypted code version message occupying respective portions of blocks 2 and 3.

The digital data 1400 is processed by a security processor or other logic of the STB 104, client computer 1204, or other computing device, which receives the digital data 1400. With this processing, the security processor or other logic performs first stage decryption operations on the digital data using a first decryption technique, e.g., AES-CBC, to produce first decrypted data 1402. In other embodiments, the first decryption technique may be another type of decryption technique. The first decrypted data 1402 includes decrypted content and the encrypted code version message. With the construct of the first decrypted data 1402, some decrypted content resides in 128 bit (or byte) blocks. These blocks of decrypted content may be suitable for processing. Alternately, this decrypted content may require further processing. The encrypted code version message spans 128 bit (or byte) blocks such that portions of the encrypted code version message shares 128 bit (or byte) blocks with decrypted content.

The security processor or other logic then performs section stage decryption of the encrypted code version message to produce the code version message 1404. The security processor may perform further verification of the code version message, such as was previously described with reference to FIGS. 3 and 4. After verification/validation of the code version message, the security processor or other logic may then compare a stored code version to a reference code version extracted from the code version message.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An apparatus comprising:
   a communication interface operable to receive digital messages and digital content;
   memory operable to store the digital messages and the digital content; and
   processing circuitry coupled to the communication interface and to the memory and operable to:
      receive a digital message and the digital content;
      extract a key portion and a rights portion from the digital message;
      decrypt the key portion using a program key to produce a program identification key (PID);
      descramble the digital content;
      decrypt the rights portion using the PID;
      determine protected and unprotected digital content based upon the rights portion;
      write the unprotected digital content to an unprotected portion of the memory; and
      write the protected digital content to a protected portion of the memory.

2. The apparatus of claim 1, wherein:
   the decrypted key portion comprises a plurality of content identifiers; and
   the decrypted rights portion comprises protection data for each of the content identifiers.

3. The apparatus of claim 1, wherein the processing circuitry comprises:
   a central processing unit; and
   at least one audio/video processor, wherein the protected portion of the memory is not accessible by the central processing unit and is accessible by the at least one audio/video processor.

4. The apparatus of claim 1, wherein the apparatus comprises at least one of:
   a cable set top box receiver;
   a satellite set top box receiver;
   a Digital Subscriber Line (DSL) set top box receiver;
   a Wireless Wide Area Network (WWAN) receiver;
   a client computer;
   a tablet computing device; and
   a phone.

5. The apparatus of claim 1, wherein in extracting the rights portion from the digital message the processing circuitry is operable to:
   decrypt the key portion to produce a decrypted result; and
   decrypt the rights portion using the decrypted result to produce the decrypted rights portion.

6. The apparatus of claim 5, wherein:
   the decrypted key portion comprises a plurality of content identifiers; and
   the decrypted rights portion comprises protection data for each of the content identifiers.

7. The apparatus of claim 1, wherein the processing circuitry is operable to scramble the protected digital content before it is written to the protected portion of the memory.

8. The apparatus of claim 1, wherein:
   the rights portion further comprises a validation portion; and
   the processing circuitry is operable to validate the validation portion.

9. The apparatus of claim 1, wherein the key portion and the rights portion are tied together cryptographically.

10. A method comprising:
    receiving content and a digital message by an electronic device from a remote device;
    extracting a key portion and a rights portion from the digital message;
    decrypting the key portion using a program key to produce a program identification key (PID);
    decrypting the rights portion using the PID;
    receiving digital content from a remote device;
    descrambling the digital content using the decrypted key portion;
    determining protected and unprotected digital content based upon the rights portion;
    writing the unprotected digital content to an unprotected portion of memory; and
    writing the protected digital content to a protected portion of the memory wherein the protected portion may only be accessed by a content processor configured to access the protected portion.

11. The method of claim 10, wherein:
    the decrypted key portion comprises a plurality of content identifiers; and
    the decrypted rights portion comprises protection data for each of the content identifiers.

12. The method of claim 10, wherein extracting the rights portion from the digital message comprises:
    decrypting the key portion to produce a decrypted result; and
    decrypting the rights portion using the decrypted result to produce the decrypted rights portion.

13. The method of claim 10, further comprising scrambling the protected digital content before it is written to the protected portion of the memory.

14. The method of claim 10, further comprising validating the rights portion.

15. The method of claim 10, further comprising precluding access to the protected portion of the memory by a central processing unit.

16. The method of claim 10, further comprising allowing access to the protected portion of the memory by at least one audio/video processing unit.

17. The method of claim 10, wherein the key portion and the rights portion are tied together crypto graphically.

18. An apparatus comprising:
- a communication interface operable to receive digital messages and digital content;
- memory operable to store the digital messages and the digital content; and
- processing circuitry coupled to the communication interface and to the memory and including a central processing unit and at least one audio/video processor, the processing circuitry operable to:
  - receive a digital message and the digital content;
  - extract a key portion and a rights portion from the digital message;
  - decrypt the key portion using a program key to produce a program identification key (PID);
  - descramble the digital content using the decrypted key portion;
  - decrypt the rights portion using the PID;
  - determine protected and unprotected digital content based upon the rights portion;
  - write the unprotected digital content to an unprotected portion of the memory that is accessible to both the central processing unit the at least one audio/video processor; and
  - write the protected digital content to a protected portion of the memory that is accessible only to the at least one audio/video processor and is not accessible by the central processing unit.

19. The apparatus of claim 18, wherein:
- the decrypted key portion comprises a plurality of content identifiers; and
- the decrypted rights portion comprises protection data for each of the content identifiers.

20. The apparatus of claim 18, wherein the apparatus comprises at least one of:
- a cable set top box receiver;
- a satellite set top box receiver;
- a Digital Subscriber Line (DSL) set top box receiver;
- a Wireless Wide Area Network (WWAN) receiver;
- a client computer;
- a tablet computing device; and
- a phone.

21. The apparatus of claim 18, wherein in extracting the rights portion from the digital message the processing circuitry is operable to:
- decrypt the key portion to produce a decrypted result; and
- decrypt the rights portion using the decrypted result to produce the decrypted rights portion.

22. The apparatus of claim 18, wherein the processing circuitry is operable to scramble the protected digital content before it is written to the protected portion of the memory.

23. The apparatus of claim 18, wherein the key portion and the rights portion are tied together cryptographically.

* * * * *

UNITED STATES PATENT AND TRADEMARK OFFICE
CERTIFICATE OF CORRECTION

PATENT NO. : 8,565,427 B2
APPLICATION NO. : 13/074083
DATED : October 22, 2013
INVENTOR(S) : Rodgers et al.

Page 1 of 1

It is certified that error appears in the above-identified patent and that said Letters Patent is hereby corrected as shown below:

In the Claims

Col. 19, lines 29-30, in claim 8: after "descramble the digital content" delete "using the decrypted key portion"

Signed and Sealed this
Eighth Day of July, 2014

Michelle K. Lee
*Deputy Director of the United States Patent and Trademark Office*